United States Patent Office 3,202,586
Patented Aug. 24, 1965

3,202,586
METHOD FOR CONTROLLING THE COMPOSITION OF URANIUM CARBIDE AND NUCLEAR FUEL ELEMENT THEREOF
Bradley A. Webb, Granada Hills, and Nathan R. Koenig, Citrus Heights, Calif., assignors, by mesne assignments, to the United States of America as represented by the United States Atomic Energy Commission
No Drawing. Filed Aug. 10, 1962, Ser. No. 216,078
9 Claims. (Cl. 176—70)

The present invention relates to a method of preventing carburization of nuclear reactor fuel element cladding metals by uranium carbide fuels, and more particularly to a method of preventing carbon transfer from hyperstoichiometric uranium carbide fuel to stainless steel cladding.

Uranium monocarbide (hereinafter referred to as UC or uranium carbide) shows considerable promise as a fuel material for high temperature nuclear reactors, such as liquid sodium-cooled reactors. Uranium carbide possesses the high burn-up characteristics and radiation stability of ceramic fuels such as $UO_2$, and also has heat transfer characteristics considerably superior to the ceramic fuels, approaching those of uranium metal. Irradiation data for uranium carbide indicate that a maximum burn-up level has not been reached at 20,000 mwd./m.t.U and at a peak temperature of 1950° F. Fission gas release is small and dimensional changes are well within acceptable limits. However, materials compatibility, as influenced by temperature and fuel composition, presents definite limitations on UC fuels. A severe problem in this area is the carburization of ferrous metal claddings by hyperstoichiometric UC in a sodium environment at temperatures above 1000° F. (Sodium or NaK is used as a bonding agent between UC and metal claddings in fuel elements). The stoichiometric concentration of carbon in uranium monocarbide is 4.80 weight percent; however, the control of carbon content in UC to close tolerances in the current arc melting and casting methods is extremely difficult and may not be a satisfactory solution to the carburization problem. The use of hypostoichiometric UC has been suggested, but other problems may be created by its use, such as poor radiation stability of included uranuim, phase inversions, and low uranium melting point.

The $UC_2$ phase in hyperstoichiometric UC is a carbon source for carburization of the cladding, and the degree of carburization of the cladding is directly related to the carbon content of the UC for a given time and temperature. At 1200° F. operation, the carbon level in type 304 stainless steel cladding reaches about 0.5% at a UC composition of 4.84 weight percent carbon, and about 1.0% at a UC composition of about 4.88 weight percent carbon. This carburization rate is of such a magnitude that a UC fuel element bonded to a stainless steel cladding with a sodium bond has a considerable risk of failure during its operating lifetime from cladding cracks caused by embrittlement of the steel. Therefore, uranium carbide fuel elements cannot be safely used as a fuel in high temperature reactors unless carbon diffusion to the cladding is prevented.

The principal object of the present invention, therefore, is to provide a method of preventing carburization of cladding metals for uranium carbide fuel elements.

Another object is to provide a method of controlling the composition of uranium carbide.

Another object is to provide a method of producing uranium carbide free of $UC_2$.

Another object is to provide a method of producing uranium carbide free of unalloyed uranium.

Still another object is to provide an addition to uranium carbide which forms a second carbide phase with any carbon in excess of that required for stoichiometric UC, and which also alloys with any free uranium, thereby closely controlling phase formation and composition.

Still another object is to provide a method of preventing carbon transfer from hyperstoichiometric UC fuel to a ferrous metal cladding.

Other objects and advantages of the invention will appear from the following detailed description and the appended claims.

In accordance with the present invention, stoichiometric uranium carbide free of $UC_2$ or unalloyed uranium may be obtained by adding a metal to the carbide which has a free energy of formation value ($\Delta F$) for its carbide which is intermediate to UC and $UC_2$. Such a metal will form a second carbide phase with any carbon present in excess of that required for stoichiometric UC according to the reaction:

$$UC_2 + X \rightarrow UC + XC$$ 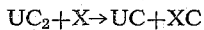

wherein XC represents the metal carbide with a $\Delta F$ value intermediate to UC and $UC_2$. The XC may be present as a second phase or may form a single solid solution phase or a single ternary compound phase. Any excess X will revert to the grain boundaries as uncombined metal. In the event the UC is deficient in carbon, the metal addition will alloy with the free uranium in the grain boundaries to form a uranium alloy. In this case, the $\Delta F$ for the formation of the metal carbide is less negative than that of UC, but need not be more negative than $UC_2$ since there is a deficiency of carbon and no $UC_2$ can form.

The use of the present invention prevents $UC_2$ formation by reaction with carbon in excess of that required for stoichiometric UC. The addition stabilizes and improves metallic grain boundary phase by forming stable, irradiation-resistant, uranium alloys. It also permits use of a cemented carbide structure with maximum refractory fuel content and high uranium inventory. Of considerable importance in manufacturing, wide variation of carbon limits in UC production is permitted since minimizing the amount of the UC phase is no longer necessary from a carbon transfer standpoint. The present severe process control requirements which are imposed to maintain stoichiometry are thereby relieved. For example, the carbon content specification can be changed to 4.7±0.4 weight percent carbon in lieu of the 4.9±0.1 weight percent carbon currently specified, since this would result in a minimum of 92 volume percent UC with the remainder as UX alloy or mixed carbide. The carbon control and phase stabilization achieved with the present invention should also increase the radiation stability of UC fuel elements. In addition to the alloying metal forming a carbide with a $\Delta F$ which is intermediate to UC and $UC_2$, the metal should also have a relatively low thermal neutron absorption cross section.

The following are examples of the elements which meet the foregoing criteria and are found to be satisfactory in controlling UC stoichiometry: tungsten, beryllium, molybdenum, chromium, silicon, and vanadium. Molybdenum is a particularly satisfactory alloying addition; it forms a U-Mo alloy with the free uranium in hypostoichiometric UC and forms a carbide with excess carbon in hyperstoichiometric UC. The concentration of the addition will vary according to such factors as the amount of the excess or deficiency of carbon, and the concentration of the additive required to form a continuous metal matrix or new phase. This will generally range between about 1–15 weight percent. For example, approximately 5 weight percent chromium and approximately 10 weight percent molybdenum are found to be satisfactory. The additive may be incorporated in the UC according to methods known to the art. For example, the addition may be incorporated in UC raw material, as the metal in the arc melting process, or it may be incorporated by powder metallurgy techniques.

The following example will illustrate the present invention in greater detail.

*Example*

Uranium carbide fuel containing molybdenum additions were prepared by arc casting for irradiation experiments. UC feed material was arc melted together with 5 volume percent and 10 volume percent additions of molybdenum metal and cast into 0.500-inch-diameter by 2-inch-long cylindrical slugs. The UC feed material varied in composition from 4.4 weight percent C to 5.2 weight percent C. In the fuel slugs containing carbon contents below stoichiometric (4.8 weight percent C), the molybdenum combined with the free uranium to form a cemented carbide consisting of UC grains bonded with uranium-molybdenum alloys in the grain boundaries. In the fuel slugs containing excess carbon, the molybdenum combined with the excess carbon to form uranium carbide mixed with a uranium-molybdenum-carbide phase. With stoichiometric UC, the molybdenum partitioned to the grain boundaries without reacting with the UC. In this manner, uranium carbide fuel slugs were prepared which contained no free uranium or $UC_2$ over a wide range of carbon compositions. These observations were verified by metallographic, X-ray diffraction, and microprobe analyses.

The fuel slugs were inserted in type 304 stainless steel fuel tubes and bonded with sodium. The tubes were assembled in irradiation test capsules and irradiated to burnups of 5,000 to 10,000 mwd./m.t. U at surface and center temperatures of 1200° F. and 1900° F., respectively. The irradiation tests indicate that high burnup is achieved with minimal fuel distortion and minimal carbon transfer to the stainless steel cladding.

In this example, the objective of producing a uranium carbide fuel free of both unalloyed uranium and $UC_2$ with a single alloying addition was effectively accomplished.

The above example is only illustrative rather than restrictive of the present invention, which should be understood to be limited only as is indicated in the appended claims.

It is claimed:

1. A method of preparing stoichiometric uranium monocarbide from nonstoichiometric uranium carbide which comprises adding to nonstoichiometric uranium carbide selected from the class consisting of hyper- and hypostoichiometric uranium carbide an alloying metal having a relatively low thermal neutron absorption cross section and a $\Delta F$ value for carbide formation between UC and $UC_2$ and reacting the admixture to form stoichiometric uranium monocarbide and a composition selected from the class consisting of metal carbide and metal-uranium alloy formed by respective reaction with initially present nonstoichiometric uranium carbide selected from the class consisting of hyper- and hypostoichiometric uranium carbide, respectively.

2. A method of preparing stoichiometric uranium monocarbide from nonstoichiometric uranium carbide which comprises adding to nonstoichiometric uranium carbide selected from the class consisting of hyper- and hypostoichiometric uranium carbide an element selected from the class consisting of beryllium, molybdenum, tungsten, chromium, silicon, and vanadium and reacting the admixture to form stoichiometric uranium monocarbide and a composition selected from the class consisting of metal carbide and metal-uranium alloy formed by respective reaction with initially present nonstoichiometric uranium carbide selected from the class consisting of hyper- and hypostoichiometric uranium carbide, respectively.

3. The method of claim 2 wherein the concentration of the additive element is approximately 1 to 15 weight percent.

4. The method of claim 2 wherein said additive is approximately 10 weight percent molybdenum.

5. The method of claim 2 wherein said additive is approximately 5 weight percent chromium.

6. A uranium carbide nuclear reactor fuel element having a carburizable metal cladding stabilized against carburization by carbon transfer from the fuel material which comprises, in combination, a carbon-stable nuclear reactor fuel material consisting essentially of stoichiometric uranium monocarbide containing a composition selected from the class consisting of metal carbide and metal-uranium alloy formed by respective reaction with initially present nonstoichiometric uranium carbide selected from the class consisting of hyper- and hypostoichiometric uranium carbide, respectively, the metal portion of said metal carbide and metal-uranium alloy being selected from an alloying metal having a relatively low thermal neutron absorption cross section and a $\Delta F$ value for carbide formation between UC and $UC_2$, and a carburizable metal cladding for said fuel material.

7. A fuel element according to claim 6 wherein in said composition the metal portion is selected from the class consisting of beryllium, molybdenum, tungsten, chromium, silicon, and vanadium.

8. A fuel element according to claim 7, said metal being molybdenum.

9. A fuel element according to claim 7, said metal being chromium.

References Cited by the Examiner

Kaufmann: Nuclear Reactor Fuel Elements, March 1962, p. 288.

Hausner et al.: Nuclear Fuel Elements, November 1959, pp. 202 and 208.

Nuclear Science Abstract No. 18727, vol. 13, p. 2510, October 1959.

Nuclear Engineering Data Sheet No. 15, Uranium Carbide, Nuclear Engineering, vol. 5, No. 51, August 1960, between pp. 354 and 355.

AEC Document NDA–2140–2, September 1960, p. 33.

AEC Document TID–7589, September 1960, pp. 28 and 29.

Nuclear Science Abstract No. 539, vol. 15, p. 74, February 1961.

Reactor Core Materials, May 1961, vol. 4, No. 2, p. 10.

CARL D. QUARFORTH, *Primary Examiner.*

REUBEN EPSTEIN, *Examiner.*